United States Patent [19]

Sato et al.

[11] 4,364,443
[45] Dec. 21, 1982

[54] SUSPENSION APPARATUS FOR TRACK-TYPE VEHICLES

[75] Inventors: Yoshito Sato, Hirakata; Minoru Matsumoto, Katano, both of Japan

[73] Assignee: Kabushiki Kaisha Komatsu Seisakusho, Tokyo, Japan

[21] Appl. No.: 216,785

[22] Filed: Dec. 16, 1980

[30] Foreign Application Priority Data

Dec. 18, 1979 [JP] Japan ................................ 54-163501

[51] Int. Cl.³ ............................................ B62D 55/00
[52] U.S. Cl. ........................................ 180/9.5; 305/29
[58] Field of Search ...................... 180/9.5, 9.52, 9.54; 305/29

[56] References Cited

U.S. PATENT DOCUMENTS

| | | | |
|---|---|---|---|
| 2,988,159 | 6/1961 | Weber | 180/9.5 |
| 3,687,226 | 8/1972 | Coyne | 180/9.5 |
| 3,871,462 | 3/1975 | Krolak et al. | 180/9.5 |
| 3,980,149 | 9/1976 | Blomstrom et al. | 180/9.5 |
| 4,120,372 | 10/1978 | Hartwick | 180/9.5 |

*Primary Examiner*—Joseph F. Peters, Jr.
*Assistant Examiner*—Ross Weaver
*Attorney, Agent, or Firm*—Armstrong, Nikaido, Marmelstein & Kubovcik

[57] ABSTRACT

A suspension apparatus for a track-type vehicle comprises a main frame having a pair of laterally spaced track frames pivotally mounted on either side thereof through a pair of pivot shafts fixedly connected to either side thereof. The forward portions of the track frames are connected to opposite ends of an equalizer bar extending transversely therebetween through a pair of stress-relieved mounting devices into which lateral and vertical displacements of the track frames and the equalizer bar are absorbed so as to prevent "toe-in" of the track frames.

7 Claims, 13 Drawing Figures

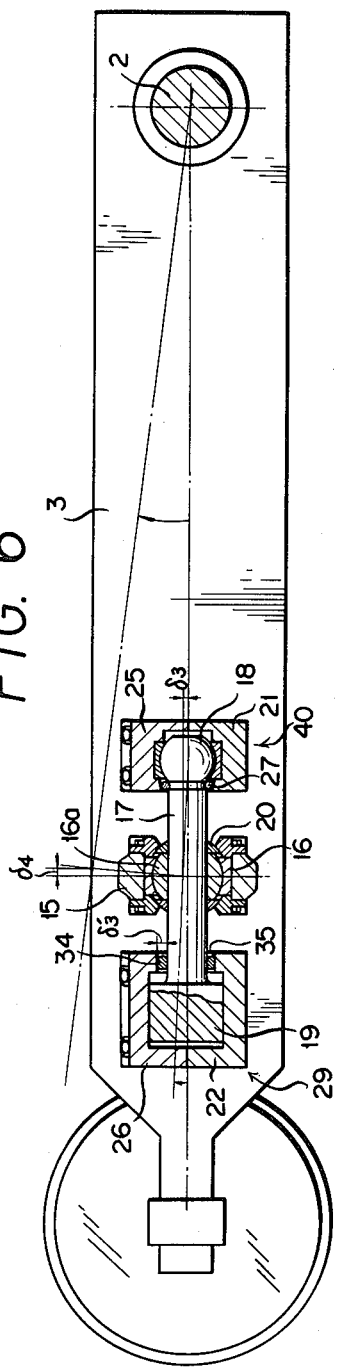
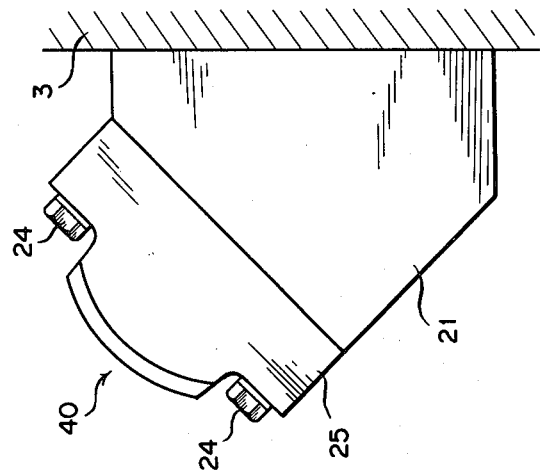

SUSPENSION APPARATUS FOR TRACK-TYPE VEHICLES

BACKGROUND OF THE INVENTION

1. Field of the Invention

This invention relates to an improvement in the suspension apparatus for track-type vehicles, and more particularly to the suspension apparatus having track frames mounted on the main frame of the vehicle in a manner such as being freely oscillatory in a vertical plane.

2. Description of the Prior Art

As for the suspension apparatus of the kind specified, the diagonal brace type suspension apparatus has heretofore been commonly employed. However, the suspension apparatus of this type has been disadvantageous in that it is difficult to effect assembly and disassembly thereof because of its construction per se, in that the productivity in manufacturing track frames is limited, and in that it is inconvenient to convey the vehicles equipped with the suspension apparatus of this type by a wheeled vehicle, because the diagonal brace projects out.

As an example which has been devised to eliminate the above-mentioned disadvantages of the conventional diagonal brace type suspension apparatus, there has been suggested a system disclosed in the U.S. Pat. No. 3,980,149 which is arranged such that a pivot shaft transversely passes through a main frame of a track-type vehicle and extends there from on the left and right sides, that an equalizer bar is coupled with the left- and right-side track frames by means of spherical joints, and that "toe-in" which occurs during the oscillation thereof can be taken up by a deflection of the pivot shaft.

This construction is, however, disadvantageous in that the necessity of making the pivot shaft long enough so as to pass transversely through the main frame results in a substantial increase in the production cost thereof, and in that, because a deflection of the shaft takes place in the vertical direction, there is a tendency to cause partial wears of the track rollers and track links. Further, the construction of this type is disadvantageous in that, because there is almost no idly play in the ball joint portion between the track frames and the equalizer bar, a front portion of each of the track frames tends to be raised during the earth moving operation, which results in a considerable reduction in the tractive force of the vehicle due to the reduction in the area of the track frames kept in contact with the ground surface thereby causing a reduction in the operating performance of the vehicle as well as an accelerated wear of the track shoes.

SUMMARY OF THE INVENTION

The present invention has been contemplated in view of the above-mentioned circumstances, and has for its aspect to provide a suspension apparatus for use in tractor-type vehicles wherein a stress-relieved mounting means is provided between track frames and an equalizer bar so that the "toe-in" which occurs during the oscillation of the track frames can be taken up thereby reducing the length of the pivot shaft so as to reduce the manufacturing cost thereof.

A further aspect of the present invention is to provide a suspension apparatus for use in tractor-type vehicles in which the lifting of the front portions of the track frames during the earth moving can be eliminated so as to prevent the reduction in the tractive force thereby preventing the reduction in the operating performance of the vehicle as well as the accelerated wear of the track shoes.

In order to achieve the foregoing aspects of the invention, there is provided a suspension apparatus comprising a main frame, pivot shaft means fixedly secured to and transversely outwardly extending from the main frame, a pair of laterally spaced track frame assemblies pivotally connected through the pivot shaft means to either side of the main frame, respectively, an equalizer bar pivotally connected to the main frame and extending transversely between the pair of track frame assemblies, characterized in that said apparatus is provided between the track frame assembly and the equalizer bar with a pair of stress-relieved mounting devices, each comprising forward and rearward mountings fixedly secured to the inner vertical surface of the track frame assembly, a shaft having at the rearward end thereof a spherical part pivotally accommodated through a spherical bush within the rearward mounting and having at the forward end thereof a square block part loosely housed within the forward mounting, and a spherical bushing means pivotally connected to each end of the equalizer bar and slidably mounted on a substantially intermediate portion of the shaft.

The square block part of the shaft is formed at an inner lateral side thereof with a vertically cut-off portion into which is inserted a resilient pad member so as to be interposed between the square block part and the inside of the forward mounting.

Accordingly, "toe-in" generated when the track frames are vertically oscillated about the pivot shaft means due to a drive of the vehicle on uneven ground can be eliminated by the operation of the stress-relieved mounting devices, because any stress applied on the track frame assemblies are absorbed into the deformation of the resilient pad and clearances formed between the square block part of the shaft and the inside of the forward mounting. At the same time, the pivot shaft means is not subjected to excessive bending stresses also.

Further, because a vertical idle play is provided by the stress-relieved mounting devices between the track frame assemblies and the equalizer bar, respective forward ends of the track frame assemblies will be not raised during the earth moving operation of the vehicle, and therefore the reduction in the tractive force can be prevented, and further the reduction in the operating performance of the vehicle as well as the accelerated wear of the track shoes can be prevented.

BRIEF DESCRIPTION OF THE DRAWINGS

Other aspects, features and advantages of the present invention will become apparent from the following description taken in conjunction with the accompanying drawings in which:

FIG. 6 is a fragmentary partially vertical-sectional view taken along line VI—VI in FIG. 3;

FIG. 7 is a fragmentary vertical side view taken in the direction shown by an arrow VII in FIG. 5;

DETAILED DESCRIPTION OF THE PREFERRED EMBODIMENT

Figure 1:
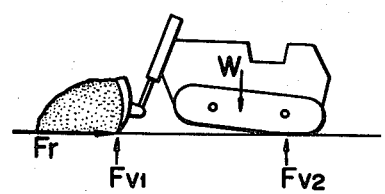
FIG. 1 is an explanatory view of the operation of a track-type vehicle provided with the prior art suspension apparatus.
Figure 2:
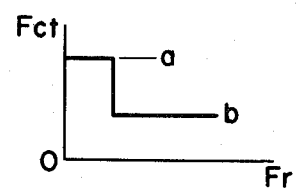
FIG. 2 is a diagram explaining the relationship between the tractive force and the resistance to excavation in the prior art suspension apparatus.
Figure 3:
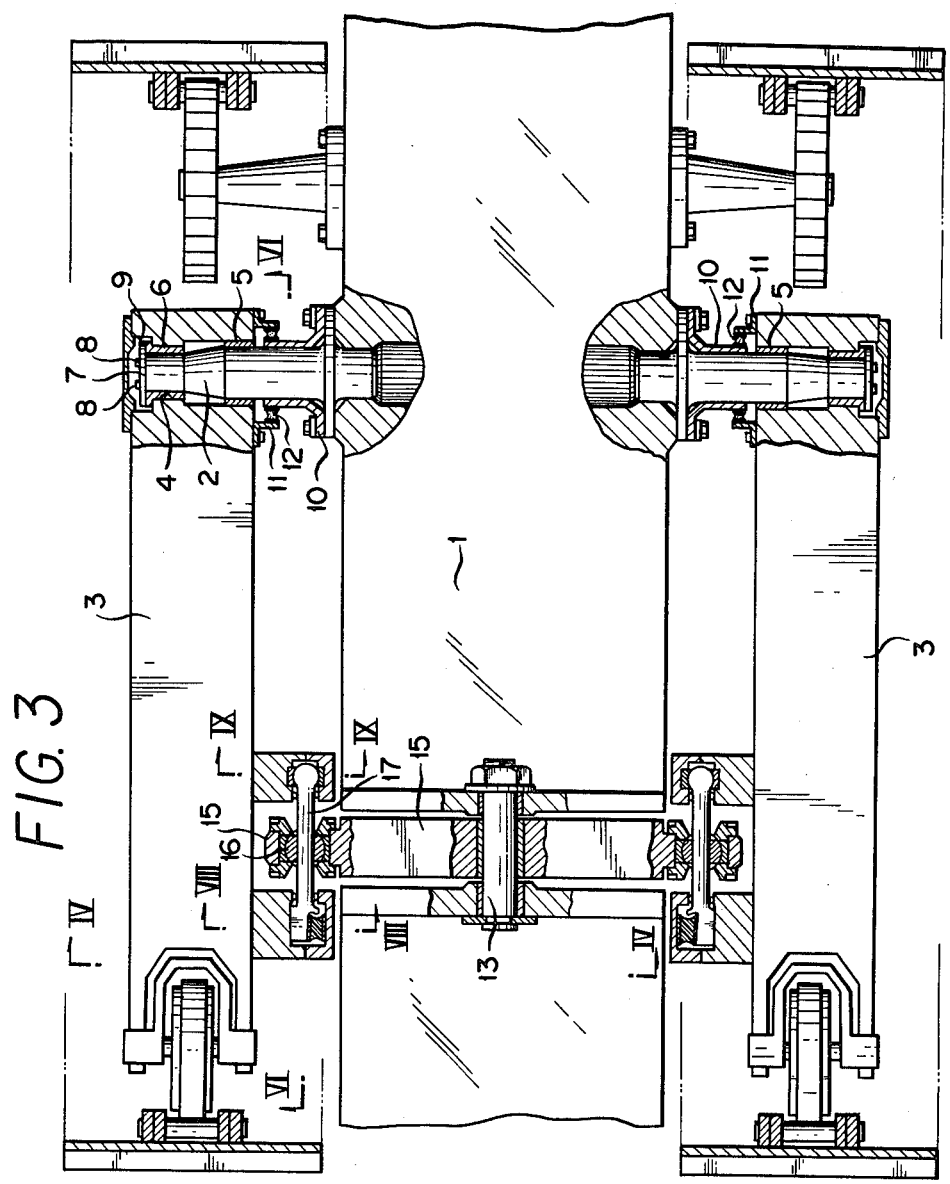
FIG. 3 is a fragmentary partially sectional plane view of a track-type vehicle in which the overall arrangement of a first embodiment of the present invention is indicated.
Figure 4:
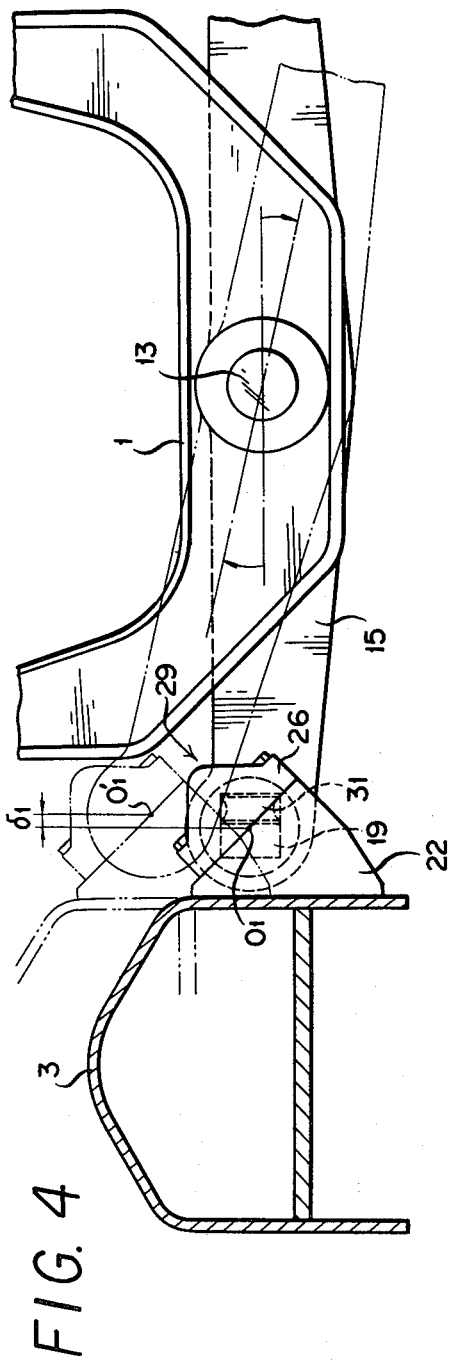
FIG. 4 is a fragmentary partially vertical-sectional view taken along line IV—IV in FIG. 3.

Reference is now made to FIG. 1, there is shown a previously produced track-type vehicle under the earth moving condition having a pair of laterally spaced track frames rigidly connected to a main frame or an equalizer bar. As is obvious from this drawing, respective forward ends of a pair of endless track assembles of the vehicle are raised by the action of the reaction force received from the ground surface, whilst respective rearward ends of the endless track assembles are subjected to a force larger than the usual one and urged to the ground surface. In FIG. 1, reference symbol W represents the whole weight of the vehicle; $Fv_1$ is a reaction force from the ground surface against a force applied on the blade tip; $Fv_2$ is a reaction force from the ground surface against a vertical force acted at the contacting points of the endless track assemblies; and $Fr$ is a resistance force against excavation. FIG. 2 is a graph showing the relationship between the tractive force $Fct$ and the resistance to excavation $Fr$ in the conventional track-type vehicle having no stress-relieved mounting or idle play between the track frames and the main frame as shown in FIG. 1. In FIG. 2, a character "a" indicates the case when the whole surfaces of the endless tracks are kept in contact with the ground surface, whilst the character "b" indicates the case when the front portions of the endless tracks are lifted under the influence of the reactive force exerted by the ground surface.

In the next place, the present invention will be described in detail with reference to FIGS. 3 to 13. In the drawings, reference numeral 1 denotes a main frame having pivot shafts 2 fixedly secured thereto. A pair of track frames 3 are pivotally connected to the pivot shafts 2, respectively, so that they can be oscillated freely as will be described hereinbelow.

Stating in brief, each pivot shaft 2 is fitted in a hole 4 formed in each of the track frames 3 through bushes 5 and 6, and a thrust washer 7 is fixedly secured to the end of each of the pivot shaft 2 by means of bolts 8, the thrust washer 7 being mounted on a thrust retainer seat 9.

Further, fixedly secured to each of the pivot shafts 2 is a thrust ring 10, and an oil seal 12 is disposed between the thrust ring 10 and a retainer 11 mounted on the side of the track frame 3.

The main frame 1 has a pin 13 fitted therein. An equalizer bar 15 is pivotally mounted on the pin 13 through a bush 14 so that the equalizer bar may be oscillated freely about the pin 13 in a vertical plane.

Mounting brackets 21 and 22 are fixedly secured to the inner vertical surface of each of the track frames 3 and project inwardly therefrom. The bracket 21 has a cap 25 fixedly secured thereto by means of bolts 24 so as to form a dividable rearward mounting 40. On the other hand, the bracket 22 forms a dividable forward mounting 29 in combination with a cap 26 fixedly connected thereto by means of bolts. Both the mountings 40 and 29 carry a shaft 17 having at its rearward end a spherical part 18 and at its foward end a block part 19. As shown in detail in FIG. 5, in a first embodiment of this invention, the spherical part 18 of the shaft 17 is carried by the rearward mounting 40 through a spherical bush 23 accommodated within the mounting 40, whilst the block part 19 having a square shape is carried by the forward mounting.

The square block part 19 of the shaft 17 is provided at an inner lateral side thereof with a vertically cut-off portion 30 in which a resilient pad member 31 is inserted in a manner such that the member 31 is interposed between the cut-off portion 30 of the square block part 19 of the shaft 17 and the inside of the mounting 29.

Further, the forward and the rearward mounting are provided at their respective openings with oil-seals 34 and 27 for oil-tightness within their respective insides.

On an intermediate portion of the shaft 17 is slidably mounted through an inner race 16a a spherical bushing 16 pivotally connected to each end of the equalizer bar 15. At both sides of the spherical bushing 16, oil seals 20 are mounted.

Figure 8:
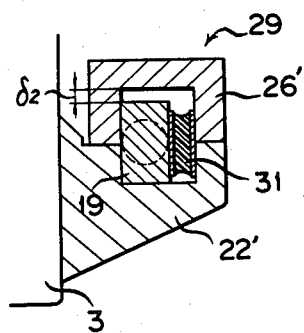
FIG. 8 is a fragmentary vertical-sectional view of a second embodiment of the present invention which corresponds to a sectional view taken along line VIII—VIII in FIG. 3.

Between the inner peripheral surface of the opening 32 of the forward mounting 29 and the outer peripheral surface of the shaft 17, a clearance $\delta_1'$ is formed. On the other hand, as another embodiment, an upper clearance $\delta_2$ is formed between the upper end face of the block part 19 and the ceiling of the inside of the forward mounting 29, as shown in FIG. 8.

Figure 5:
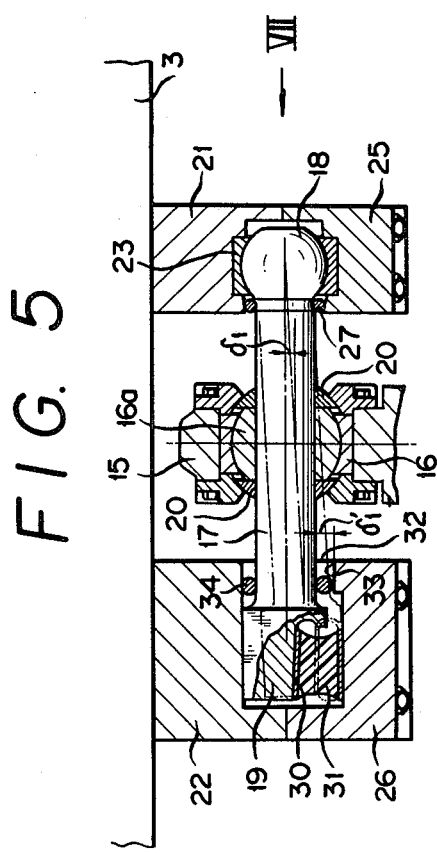
FIG. 5 is a fragmentary partially enlarged view of the embodiment shown in FIG. 3.

Thus, the track frames 3 can be vertically oscillated about the pivot shafts 2, respectively, when the vehicle transverses uneven ground. As a result, the lateral displacement $\delta_1$ created by the vertical oscillation of the equalizer bar 15 as well as the track frames 3 can be absorbed by a lateral inclination of the shaft 17 as shown in FIG. 5. At that time, the resilient pad 31 serves as preventing or eliminating shakes of the shaft 17 and also preventing "toe-in" of the track frames.

On the other hand, as shown in FIG. 6, the longitudinal displacement $\delta_4$ of each track frame 3 simultaneously generated at the vertical oscillation of the track frame 3 can be absorbed by the sliding movement of the equalizer bar 15 through the spherical bushing 16 on and with respect to the shaft 17.

Figure 10:
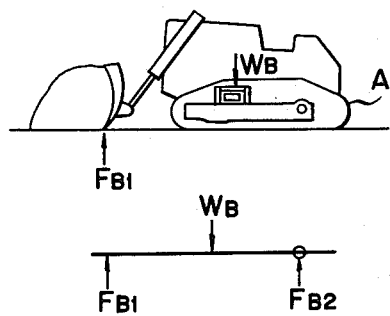
FIG. 10 is an explanatory view of the operation of a track-type vehicle provided with the suspension apparatus of the present invention.

When the equalizer bar 15 as well as the track frames 3 is oscillated upwards, the raising of the forward ends of the track frames 3 is delayed by the clearance $\delta_2$. Therefore, while the forward ends of the track frames 3 is not raised upwards as shown in FIG. 10, the resistance against excavation can be reduced and the area of the endless track assemblies kept in contact with the ground surface can be increased so as to increase the tractive force Fct, because the reaction force $F_{B1}$ corresponding to a force applied to the blade tip during the earth moving operation of the vehicle is caused by only the weight $W_B$ of the upper structure of the vehicle. Namely, the weight $W_T$ of the endless track assemblies "A" is not applied to the blade tip.

Figure 9:
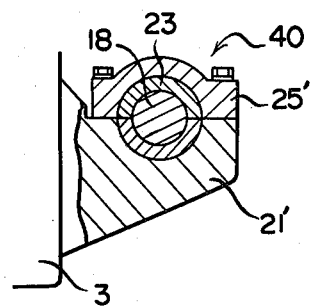
FIG. 9 is a fragmentary vertical-sectional view of the second embodiment which corresponds to a sectional view taken along line IX—IX in FIG. 3.

In FIGS. 8 and 9, is shown another embodiment of the principle part of the present invention in which mating surfaces between respective caps 25', 26' of the mountings 40, 29 and the brackets 21', 22' are kept in horizontal, respectively.

Figure 11:
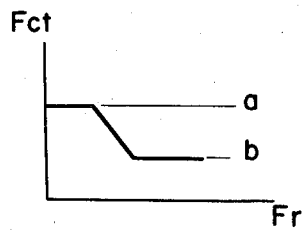
FIG. 11 is a diagram showing the relationship between the tractive force and the resistance to excavation of the vehicle shown in FIG. 10.

When a larger excavation force is required which tends to raise the forward ends of the endless track assemblies "A", the equalizer bar 15 will move upwards by a clearance $\delta_2$ to cause a time lag so that it becomes possible to follow up the control of the blade as shown in FIG. 11.

FIG. 11 illustrates the relationship between the tractive force Fct and the resistance to excavation Fr in the case of a tractor-type vehicle with the clearance $\delta_2$. Reference character "a" denotes the case when the track frames are kept in completely contact with the ground surface, whilst character "b" indicates the case when the front portions of the track frames are raised.

Figure 12:
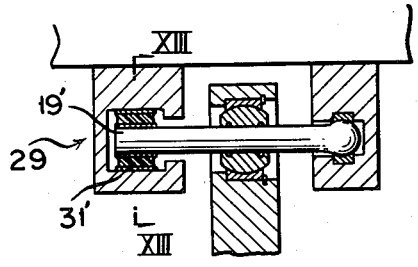
FIG. 12 is a fragmentary cross-sectional view showing a third embodiment of the principle part of the present invention.
Figure 13:
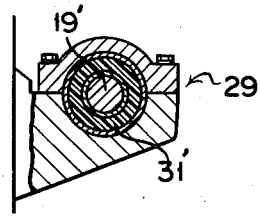
FIG. 13 is a fragmentary vertical-sectional view taken along line XIII—XIII in FIG. 12.

Further, a cylindrical member as shown in FIGS. 12 and 13 may be employed as the resilient pad 31 for mounting the shaft 17 in the mounting portion 29 as a still further embodiment of this invention.

It is to be understood that the foregoing description is merely illustrative of preferred embodiments of the present invention, and that the scope of the invention is not to be limited thereto, but is to be determined by the scope of the appended claims.

What is claimed is:

1. A suspension apparatus for a track-type vehicle comprising a main frame, pivot shaft means fixedly secured to and transversely outwardly extending from said main frame, a pair of laterally spaced track frame means pivotally connected through said pivot shaft means to either side of said main frame, respectively, an equalizer bar pivotally connected to said main frame and extending transversely between said pair of track frame means, characterized in that said apparatus is provided between said track frame means and said equalizer bar with a pair of stress-relieved mounting means, each comprising forward and rearward mountings fixedly secured to the inner vertical surface of said track frame means; a shaft having at the rearward end thereof a spherical part pivotally accommodated through a spherical bush within said rearward mounting and having at the forward end thereof a block part loosely housed within said forward mounting; a resilient pad member interposed between said block part of the shaft and the inside of said forward mounting; and spherical bushing means pivotally connected to each end of said equalizer bar and slidably mounted on a substantially intermediate portion of said shaft.

2. The suspension apparatus as claimed in claim 1, wherein said block part of the shaft is formed in a square shape having at an inner lateral side thereof a vertically cut-off portion in which the resilient pad member is inserted.

3. The suspension apparatus as claimed in claim 1, wherein a vertically upper clearance is formed between the upper end of said block part and the inside of said forward mounting.

4. The suspension apparatus as claimed in claim 1, wherein said block part is formed into a round shape in section so as to surround it with an annular resilient pad member.

5. The suspension apparatus as claimed in claim 1, wherein each of said forward and rearward mountings can be divided from a mating surface into two parts, one of which is a cap and the other of which is a mounting bracket.

6. The suspension apparatus as claimed in claim 5, wherein said mating surface is a slant surface.

7. The suspension apparatus as claimed in claim 5, wherein said mating surface is a horizontal surface.

* * * * *